June 7, 1960     R. D. COLANGELO     2,939,382
COFFEE MAKER
Filed Dec. 23, 1957
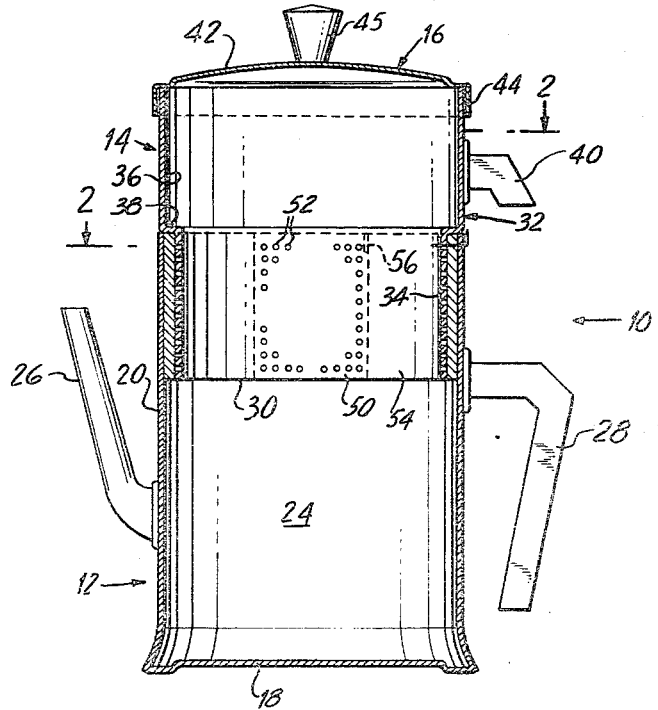
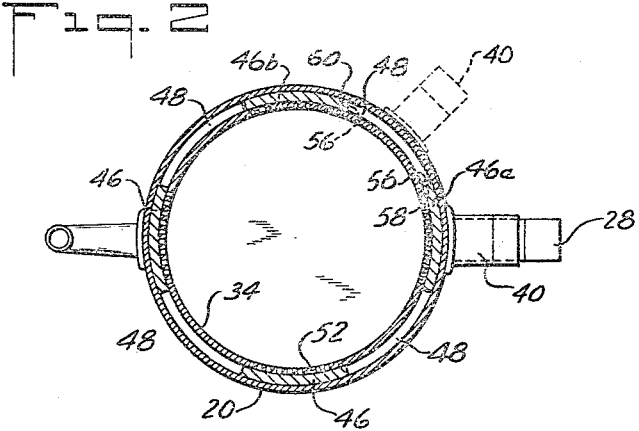
INVENTOR.
RALPH D. COLANGELO
BY Hubbell and Cohen
ATTORNEYS

United States Patent Office 2,939,382
Patented June 7, 1960

2,939,382

COFFEE MAKER

Ralph D. Colangelo, 37—35 90th St., Jackson Heights, N.Y.

Filed Dec. 23, 1957, Ser. No. 704,777

8 Claims. (Cl. 99—299)

This invention relates to coffee makers and particularly to coffee makers of the drip type.

In practically all known coffee makers now in use and on the market, the coffee maker is adapted to brew a certain maximum amount of coffee, either two cups, four cups, eight cups, etc. However, it is often desired by the user to make less than the maximum amount of coffee and this commercial coffee makers do not do satisfactorily. This is particularly true of the drip type coffee maker. As is well known, a drip type coffee maker comprises a lower receptacle or container which is adapted to contain brewed coffee, a middle or central container which is adapted to contain coffee grounds, and an upper container which is adapted to receive hot water. The bottom of the upper container and the bottom of the middle container are both provided with a plurality of small apertures through which the water may drip. Accordingly, with coffee grounds disposed in the central container, when water is introduced into the upper container it drips through the apertures in the bottom of the upper container into the central container where it comes into intimate contact with the coffee grounds and extracts the coffee flavor therefrom. The water continues to seep through the coffee grounds and then finally out through the bottom of the central container into the bottom container where it is collected for subsequent consumption. As a modification, the central container can be eliminated and the coffee grounds can be placed in the bottom of the upper container. The operation is substantially the same.

With such a coffee maker, the rate of flow of the water through the coffee grounds and into the collecting bottom container is predetermined by the size of the apertures in the bottoms of the middle and upper containers. Accordingly, the water remains in contact with the coffee grounds a predetermined time dependent solely on the amount of water introduced into the upper container of the coffee maker. If the coffee maker is adapted to make, for instance, eight cups of coffee, when it is desired to make only four cups of coffee in the container, the water will remain in intimate or brewing relation with the coffee grounds a substantially shorter period of time, thereby reducing the time during which the water can extract the flavor from the coffee grounds. This results in a substantially weaker brewed coffee which is clearly undesirable. While the user may attempt to compensate for this shortcoming by using a disproportionately large amount of coffee grounds, the compensation is at best extremely empirical and rarely yields coffee of the desired strength and flavor. The described phenomenon is well known to all persons familiar with coffee making.

In accordance with the present invention, one object thereof is to provide a new and improved coffee maker having means for controlling the time that water remains in brewing relation with the coffee grounds whereby to control the strength of the brewed coffee.

Another object of the present invention is the provision of a new and improved coffee maker having valve means for permitting and preventing the flow of coffee out of brewing relation with the coffee grounds and into a collecting container.

Another object of the present invention is the provision of a drip type coffee maker having valve means for regulating the time in which water is kept in brewing relation with the coffee grounds.

Yet a further object of the present invention is the provision of a drip type coffee maker having valve means for controlling the time in which water remains in brewing relation with coffee grounds before passing into a collecting chamber, said valve means being operated by the relative rotation between the upper container of the coffee maker and the lower container thereof.

The above and other objects, characteristics and features of construction of the present invention will be more fully understood from the following description taken in connection with the accompanying illustrative drawing.

In the drawing:

Fig. 1 is a vertical sectional view of a coffee maker embodying the present invention; and Fig. 2 is a sectional view taken along the line 2—2 of Fig. 1.

Referring now to the drawing in detail, a coffee maker embodying the present invention is generally designated by the reference numeral 10. This coffee maker comprises a lower container 12, an upper container 14 and a removable top 16. The containers 12 and 14 and top 16 may be made out of any suitable material such as, for instance, metal, glass and ceramic or combinations thereof.

Lower container 12 includes a bottom 18 and a substantially cylindrical peripheral side wall 20. Side wall 20 is provided with an opening 22 which connects the inside 24 of bottom container 12 to a spout 26. Moreover, connected to peripheral side wall 20 of bottom container 12 is a handle 28 which is made of any suitable thermal insulating material such as, for instance, plastic or wood, to facilitate gripping and handling of the coffee maker 10.

Upper container 14 is provided with an imperforate bottom 30 which is preferably integrally formed with an upstanding substantially cylindrical side wall 32. Cylindrical side wall 32 is divided into a lower portion 34 and an upper portion 36 of slightly larger diameter, a horizontal shoulder 38 connecting the portions 34 and 36. As shown and as is now preferred, the outer diameter of upper portion 36 of side wall 32 is the same as the outer diameter of side wall 20, although this is not necessary to this invention. Connected to the upper portion 36 of side wall 32 is a suitable handle 40 of any suitable thermal insulating material.

The top 16 is preferably provided with a horizontally extending portion 42 having a depending skirt 44 which fits over the outside of the upper portion 36 of peripheral side wall 32. Connected to the horizontal portion 42 of top 16 is a suitable knob 45 made of any desirable thermal insulating material to facilitate handling thereof.

In accordance with the present invention, a plurality of bosses 46 are fixed to the upper portion of peripheral side wall 20 of lower container 12. As shown herein, these bosses are substantially rectanglar in configuration and extend outwardly from the peripheral side wall to define therebetween a plurality of passages 48. The bosses 46 may be separate pieces which have been soldered, welded, riveted, cemented or otherwise fixed to wall 20, or they may be integrally formed with the wall. The distance between the surfaces of any two confronting bosses 46 is substantially the same as the outer diameter of the lower portion 34 of peripheral side wall 32 whereby to provide a tight fit between the bosses and the lower portion 34. This fit is sufficiently tight to effect a liquid seal therebetween but still permits the rotation of the top container 14 relative to the bottom container 12. Lower portion 34 of peripheral side wall 32 is provided with a plurality of rectangular perforated areas 50, each of said areas being made up of a plurality of openings 52 which are proportioned to be as large as possible without exceeding the diameter of the coffee grounds. Spaced in between each of the perforated areas 50 are imperforate or solid areas 54. The circumferential dimension of the imperforated areas 54 and the perforated areas 50 may be substantially the same although it is presently preferred to have the imperforated areas slightly larger in said dimension than the perforated areas. Fixed to the lower portion 34 of peripheral side wall 32 is a stop 56 which is disposed within one of the passages 48 and which is of a radial dimension or thickness that is slightly smaller than the thickness of the bosses 46.

In operation, the lower portion 34 of upper container 14 is partially disposed within the lower container 12 as by moving it into the lower chamber 24 until shoulder 38 bears against the upper edge of peripheral side wall 20 and the upper edges of the bosses 46. This rotatably disposes the upper container in the lower container. A stop 56 is at this time disposed in one of the passages 48. The cover 16 is removed and coffee grounds are poured into upper container 14, the amount of coffee grounds being poured being that required to yield a desired number of cups of coffee. The upper container is rotated to the solid line position shown in Fig. 2, in which position each of the perforated portions 50 underlies an associated boss 46 so that the bosses seal the openings 52 in said perforated areas to prevent any liquid from passing out of the upper container. With the upper container so positioned relative to the lower container, the stop 56 will be in abutting relation with an edge 58 of one of the bosses 46a. Preferably, with the upper container so disposed relative to the lower container, the handle 40 is disposed out of alignment with the handle 28 so as to indicate that the coffee maker is in condition for holding water in brewing relation with the coffee grounds. Water is then poured through the top of upper container 14 to thereby cause it to mingle in brewing relation with the coffee grounds previously introduced. However, none of the water can seep out of the upper container as the perforated areas 50 are sealed by the bosses 46 to thereby close the valve means comprised of these two parts.

After the water has been held in brewing relation with the coffee grounds for a sufficient time to extract substantially all of the flavor in the grounds, the user grasps the handles 40 and 28 and rotates the upper container 14 relative to the lower container 12 to a position wherein the perforated areas 50 move out from underlying relation with the bosses 46 and into registry with the passages 48. In this position the stop 56 will engage an edge 60 of another boss 46b and the handle 40 will preferably be in vertical alignment with the handle 28. In such a position the brewed coffee is free to flow out through the openings 52 in perforated areas 50 and down through the passages 48 into the chamber 24 of lower container 12. Since at the time that the valve means is opened the coffee is fully brewed, openings 52 can be substantially larger than openings heretofore employed in drip pots to thereby permit this flow to be relatively rapid when compared to the flows in drip coffee makers heretofore known. Accordingly, even though there is a period during which there is no flow, the overall time for brewing the coffee is substantially less than that heretofore experienced.

With a coffee maker of the type described, it will be obvious that if a user desires to make less than a full pot of coffee, this can be satisfactorily done with an appropriately reduced amount of coffee and water. The amount of time during which the water is held in brewing relation with the coffee grounds can be readily determined and such instructions can be imparted to a purchaser at the time of the purchase. Moreover, the amounts of coffee grounds and water necessary to make varying amounts of brewed coffee can also be easily worked out and suitable indicia can be etched or embossed or otherwise applied to the peripheral side wall 32 of upper container 14 to indicate to the user the exact amount of coffee grounds and water necessary for each number of cups which can be made in the coffee maker.

While the coffee maker shown and described herein is of the type normally found in individual homes, the principles disclosed and described herein may readily be adapted for use in commercial type coffee makers found in restaurants, diners and so forth. In lieu of the standard cloth bag commonly used in standard commercial coffee makers, a relatively rotatable container built along the principles of container 14 may be substituted therefor. Moreover, in order to adapt conventional commercial coffee makers now in use for application of the present invention, a suitable adaptor having pieces equivalent to bosses 50 may be constructed and fixed to the inner wall of conventional coffee makers in order to provide means for preventing the flow of water out of the upper container and for subsequently permitting such flow. It is believed that with the description contained herein, anyone skilled in the art can readily work out such an adaptation. Accordingly, it will be understood that the present invention is not limited to coffee makers for home use but is also suitable for commercial type coffee makers.

While I have herein shown and described one form of the present invention and have suggested a modification thereof, various other changes and modifications may be made therein within the scope of the appended claims without departing from the spirit and scope of the present invention.

Having now described my invention, what I claim as new and desire to secure by Letters Patent is:

1. A coffee maker, comprising a lower container for brewed coffee and an upper container for coffee grounds and hot water, said lower container having a cylindrical vertically extending side wall, said upper container having a cylindrical vertically extending side wall the lower portion of which is disposed within an upper portion of said side wall of said lower container for rotatably mounting said upper container in said lower container, the outer surface of said lower portion of said side wall of said upper container being spaced from the inner surface of said upper portion of said side wall of said lower container, said lower portion of said side wall of said upper container being provided with an opening adapted to permit brewed coffee to pass out of said upper container, and means fixed relative to said lower container for overlying said opening to prevent the passage of brewed coffee therethrough, rotation of said upper container relative to said lower container being effective to move said opening out of underlying relation with said last mentioned means to thereby permit brewed coffee to pass out of said upper container through said opening and into said lower container through the space between the side walls of said upper and lower containers.

2. A coffee maker, comprising a lower container for brewed coffee and an upper container for coffee grounds and hot water, said lower container having a cylindrical vertically extending side wall, said upper container having a cylindrical vertically extending side wall the lower portion of which is disposed within an upper portion of said side wall of said lower container for rotatably mounting said upper container in said lower container, the outer surface of said lower portion of said side wall of said upper container being spaced from the inner surface of said upper portion of said side wall of said lower container, said lower portion of said side wall of said upper container being provided with a plurality of openings adapted to permit brewed coffee to pass out of said upper container, and means fixed relative to said lower container for overlying said openings to prevent the passage of brewed coffee therethrough, rotation of said upper container relative to said lower container being effective to move said openings out of underlying relation with said last mentioned means to thereby permit brewed coffee to pass out of said upper container through said openings and into said lower container through the space between the side walls of said upper and lower containers.

3. A coffee maker, comprising a lower container for brewed coffee and an upper container for coffee grounds and hot water, said lower container having a cylindrical vertically extending side wall, said upper container having a cylindrical vertically extending side wall the lower portion of which is disposed within an upper portion of said side wall of said lower container for rotatably mounting said upper container in said lower container, the outer surface of said lower portion of said side wall of said upper container being spaced from the inner surface of said upper portion of said side wall of said lower container, said lower portion of said side wall of said upper container being provided with a perforated area adapted to permit brewed coffee to pass out of said upper container, and means fixed relative to said lower container for overlying said perforated area to prevent the passage of brewed coffee therethrough, a rotation of said upper container relative to said lower container being effective to move said perforated area out of underlying relation with said last mentioned means to thereby permit brewed coffee to pass out of said upper container through said perforated area and into said lower container through the space between the side walls of said upper and lower containers.

4. A coffee maker, comprising a lower container for brewed coffee and an upper container for coffee grounds and hot water, said lower container having a cylindrical vertically extending side wall, said upper container having a cylindrical vertically extending side wall the lower portion of which is disposed within an upper portion of said side wall of said lower container for rotatably mounting said upper container in said lower container, the outer surface of said lower portion of said side wall of said upper container being spaced from the inner surface of said upper portion of said side wall of said lower container, said lower portion of said side wall of said upper container being provided with a plurality of circumferentially spaced perforated areas adapted to permit brewed coffee to pass out of said upper container, a like plurality of circumferentially spaced means, one for each of said perforated areas, fixed to said lower side wall and adapted to simultaneously overlie said perforated areas to prevent the passage of brewed coffee out of said upper container, rotation of said upper container relative to said lower container being effective to move said perforated areas out of underlying relation with said last mentioned plurality of means to thereby permit brewed coffee to pass out of said upper container through said perforated areas and into said lower container through the space between the side walls of said upper and lower containers.

5. A coffee maker, comprising a lower container for brewed coffee and an upper container for coffee grounds and hot water, a lower portion of said upper container being disposed within an upper portion of said lower container for rotatably mounting said upper container in said lower container, and valve means for controlling the flow of brewed coffee out of said upper container and into said lower container, said valve means being opened and closed by the rotation of said upper container relative to said lower container, said lower container including a bottom, a cylindrical side wall extending upwardly therefrom, and a plurality of circumferentially spaced bosses fixed to an upper portion of said side wall and extending inwardly therefrom, whereby to define passages therebetween, said upper container including an imperforate bottom and a cylindrical side wall extending upwardly from said bottom, a lower portion of said side wall of said upper container being in relatively tight sliding relation with said bosses, said upper container being rotatable relative to said lower container, said lower portion of said upper side wall being provided with a like plurality of similarly circumferentially spaced perforated areas, said perforated areas and said bosses being proportioned so that said bosses can at times completely overlie said perforated areas to thereby prevent brewed coffee from passing out of said upper container, rotation of said upper container relative to said lower container being effective to move said perforated areas out of underlying relation with said bosses and into registry with said passages to permit brewed coffee to flow out of said upper container and through said passages into said lower container.

6. A coffee maker, comprising a lower container for brewed coffee and an upper container for coffee grounds and hot water, a lower portion of said upper container being disposed within an upper portion of said lower container for rotatably mounting said upper container in said lower container, and valve means for controlling the flow of brewed coffee out of said upper container and into said lower container, said valve means being opened and closed by the rotation of said upper container relative to said lower container, said lower container including a bottom, a cylindrical side wall extending upwardly therefrom, and a plurality of circumferentially spaced rectangular plates fixed to an upper portion of said side wall and extending inwardly therefrom, whereby to define passages therebetween, said upper container including an imperforate bottom and a cylindrical side wall extending upwardly from said bottom, a lower portion of said side wall of said upper container being in relatively tight sliding relation with said rectangular plates, said upper container being rotatable relative to said lower container, said lower portion of said upper side wall being provided with a like plurality of similarly circumferentially spaced perforated areas, said perforated areas and said rectangular plates being proportioned so that said rectangular plates can at times completely overlie said perforated areas to thereby prevent brewed coffee from passing out of said upper container, rotation of said upper container relative to said lower container being effective to move said perforated areas out of underlying relation with said rectangular plates and into registry with said passages to permit brewed coffee to flow out of said upper container and through said passages into said lower container.

7. A coffee maker, comprising a lower container for brewed coffee and an upper container for coffee grounds and hot water, a lower portion of said upper container being disposed within an upper portion of said lower container for rotatably mounting said upper container in said lower container, and valve means for controlling the flow of brewed coffee out of said upper container and into said lower container, said valve means being opened and closed by the rotation of said upper container relative to said lower container, said lower container including a bottom, a cylindrical side wall extending upwardly therefrom, and a plurality of circumferentially spaced rectangular plates fixed to an upper protion of said side wall and extending inwardly therefrom, whereby to define passages therebetween, said upper container including an imperforate bottom and a cylindrical side wall extending upwardly from said bottom, a lower portion of said side wall of said upper container being in relatively tight sliding relation with said rectangular plates, said upper container being rotatable relative to said lower container, said lower portion of said upper side wall being provided with a like plurality of similarly circumferentially spaced perforated areas, said perforated areas and said rectangular plates being proportioned so that said rectangular plates can at times completely overlie said perforated areas to thereby prevent brewed coffee from passing out of said upper container, rotation of said upper container relative to said lower container being effective to move said perforated areas out of underlying relation with said rectangular plates and into registry with said passages to permit brewed coffee to flow out of said upper container and through said passages into said lower container, and stop means for selectively positioning said perforated areas in underlying relation with said plates and in registry with said passages.

8. A coffee maker, comprising a lower container for brewed coffee and an upper container for coffee grounds and hot water, a lower portion of said upper container being disposed within an upper portion of said lower container for rotatably mounting said upper container in said lower container, and valve means for controlling the flow of brewed coffee out of said upper container and into said lower container, said valve means being opened and closed by the rotation of said upper container relative to said lower container, said lower container including a bottom, a cylindrical side wall extending upwardly therefrom, and a plurality of circumferentially spaced rectangular plates fixed to an upper portion of said side wall and extending inwardly therefrom, whereby to define passages therebetween, said upper container including an imperforate bottom and a cylindrical side wall extending upwardly from said bottom, a lower portion of said side wall of said upper container being in relatively tight sliding relation with said rectangular plates, said upper container being rotatable relative to said lower container, said lower portion of said upper side wall being provided with a like plurality of similarly circumferentially spaced perforated areas, said perforated areas and said rectangular plates being proportioned so that said rectangular plates can at times completely overlie said perforated areas to thereby prevent brewed coffee from passing out of said upper container, rotation of said upper container relative to said lower container being effective to move said perforated areas out of underlying relation with said rectangular plates and into registry with said passages to permit brewed coffee to flow out of said upper container and through said passages into said lower container, and a stop fixed to said lower portion of said upper side wall and disposed within one of said passages, said stop engaging an edge of one of the plates defining said one passage when said perforated areas underlie their respectively associated plates and engaging the confronting edge of the other plate defining said passage when said perforated areas are in registry with said passages.

References Cited in the file of this patent

UNITED STATES PATENTS

| | | |
|---|---|---|
| 702,122 | Ziegler | June 18, 1902 |
| 885,037 | Glover | Apr. 21, 1908 |
| 1,008,861 | Piaseczny | Nov. 14, 1911 |
| 1,188,249 | Cook | June 20, 1916 |
| 1,652,935 | Goldfield | Dec. 13, 1927 |
| 2,138,198 | Weber et al. | Nov. 29, 1938 |

FOREIGN PATENTS

| | | |
|---|---|---|
| 209,893 | Great Britain | Jan. 24, 1924 |
| 623,884 | Germany | Jan. 8, 1936 |